United States Patent
Kazmi et al.

(10) Patent No.: US 9,277,520 B2
(45) Date of Patent: Mar. 1, 2016

(54) METHODS AND ARRANGEMENTS FOR AD-HOC WIRELESS NETWORKS

(75) Inventors: Muhammad Ali Kazmi, Bromma (SE); Gabor Fodor, Hasselby (SE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 550 days.

(21) Appl. No.: 13/639,292

(22) PCT Filed: Apr. 6, 2010

(86) PCT No.: PCT/SE2010/050374
§ 371 (c)(1),
(2), (4) Date: Oct. 4, 2012

(87) PCT Pub. No.: WO2011/126414
PCT Pub. Date: Oct. 13, 2011

(65) Prior Publication Data
US 2013/0034035 A1 Feb. 7, 2013

(51) Int. Cl.
*H04W 52/02* (2009.01)
*H04W 72/00* (2009.01)
*H04W 56/00* (2009.01)
H04W 76/04 (2009.01)
H04W 84/18 (2009.01)
H04W 88/02 (2009.01)

(52) U.S. Cl.
CPC ........ *H04W 56/0085* (2013.01); *H04W 76/048* (2013.01); *H04W 84/18* (2013.01); *H04W 88/02* (2013.01)

(58) Field of Classification Search
CPC ............ H04W 52/02; H04W 52/0216; H04W 72/005; H04W 12/189
USPC .................................................. 370/311, 312
See application file for complete search history.

(56) References Cited

U.S. PATENT DOCUMENTS

| 6,950,417 | B2 | 9/2005 | Soliman | |
|---|---|---|---|---|
| 2007/0286080 | A1* | 12/2007 | Kim et al. | ..................... 370/236 |
| 2009/0268652 | A1 | 10/2009 | Kneckt | |
| 2010/0260169 | A1 | 10/2010 | Gheorghiu et al. | |

FOREIGN PATENT DOCUMENTS

| EP | 1 841 249 A1 | 10/2007 |
|---|---|---|
| EP | 1 976 165 A2 | 10/2008 |
| EP | 1983690 A1 | 10/2008 |
| RU | 2216101 C2 | 11/2003 |
| WO | WO 2007/146221 A2 | 1/2007 |
| WO | 2010/025774 A1 | 3/2010 |

* cited by examiner

*Primary Examiner* — Ronald B Abelson

(57) ABSTRACT

A method, User Equipment (UE), and network node in an ad-hoc network. The UE determines a node in the ad-hoc network that is able to provide a reference signal comprising a pattern that can be used for synchronization purposes when the UE is in DRX mode in the ad-hoc network. The node is determined by requesting the node to indicate whether the node is able to provide the reference signal, and receiving an accept signal or message from the node. The UE then receives the reference signal from the determined node, enters DRX mode, and uses the received reference signal to maintain synchronization while in the DRX mode.

21 Claims, 12 Drawing Sheets

METHODS AND ARRANGEMENTS FOR AD-HOC WIRELESS NETWORKS

TECHNICAL FIELD

The present invention relates to methods and arrangements for ad-hoc wireless networks and in particular to discontinuous reception (DRX) in ad-hoc wireless networks.

BACKGROUND

Wireless adhoc networks consist of independent wireless nodes that dynamically form connections with each other to create a network. An adhoc network does not require, although it can benefit from, any central node or centralized infrastructure or traditional cellular network. Instead, the ad-hoc network can grow or shrink "on its own" by means of state of the art discovery mechanisms and individual node decisions.

In order for the wireless nodes to form adhoc networks, there is a need for a standardized set of protocols that allows nodes to communicate and specifically for an authentication procedure that facilitates establishing secure communication links within the nodes of the adhoc network.

For example, Bluetooth adhoc networks may use the Secure Simple Pairing (SSP) protocol to exchange messages that are necessary for device discovery, connection establishment and exchanging public security keys. In addition, SSP allows for the so called I/O capability exchange that contains rudimentary information about the physical communication capabilities of the nodes.

It is expected that future wireless ad-hoc nodes will be able to provide a much broader range of services to one another than what adhoc networks are typically used for today. For instance, certain services may require that the connection is retained over a longer time. Some of these services may also be characterized by frequent transmission interruption. Another challenge would be that some services such as gaming require faster access after an interruption. Maintaining a continuous connection over a longer duration especially when transmission or reception is intertwined by inactive periods is power inefficient. Thus, efficient power saving techniques in adhoc networks are particularly beneficial and desirable when a variety of services are introduced in the near future.

Some sort of power saving mechanism is employed in all traditional cellular networks. In particular, the power saving or the so-called discontinuous reception (DRX) especially in idle mode is used in all cellular systems. In more advanced technologies such as long term evolution (LTE) or in later releases of UTRAN (UMTS Terrestrial Radio Access Network), the DRX operation is also used in the connected or active mode.

The DRX operation in idle mode and in connected mode allows the user equipment (UE) to save battery power while it enables it to camp on a cell for receiving paging and to stay connected for receiving user specific data or control information respectively. In both idle mode and in connected mode, depending upon the DRX cycle in use, the UE can stay in DRX mode for unlimited amount of time. However, in connected mode, depending upon the network implementation, the UE typically goes to idle state after a long period of inactivity, which is generally controlled by the network.

Another type of power saving technique is discontinuous transmission (DTX) at the UE. Although the original intention of the DTX operation is to reduce the received interference at the base station, lower transmission activity also enables the UE to save its battery.

The introduction of the DTX operation was particularly advantageous in traditional systems like WCDMA, where regardless of the data transmission activity, a bidirectional continuous control channel is maintained primarily to enable a closed loop power control operation. However a continuous or at least quasi-continuous control channel may also be employed in other systems such as LTE to retain synchronization, fast scheduling etc. Thus, in principle, the concept of DTX can be used in a wide range of technologies and scenarios.

In typical network implementations both DRX and DTX operations run in parallel, thus saving both battery power and interference.

Hitherto the power saving techniques such as DRX or DTX have been primarily developed for the UE. However, due to high energy costs and in order to reduce the effect of global warming, there is considerable interest in developing energy efficient wireless network nodes such as energy efficient base stations or techniques which enable the nodes to operate at lower power. Thus, the future base stations may also operate in sleep mode. Advanced methods are being developed to ensure that lower base station transmission activity does not significantly hamper the normal UE operation.

In existing ad hoc networks no explicit DRX mechanism exists. The lack of DRX operation has a number of implications:

Firstly, for time critical services e.g. voice over IP (VOIP), due to the lack of viable DRX mechanism, a typical ad hoc UE receiver has to stay continuously active. This obviously drains UE battery power. For the human end user this implies that the active talk time would be drastically different depending on cellular or ad-hoc modes, which would probably be unacceptable for most users.

In case of non time critical services e.g. interactive services, an ad hoc UE typically releases connection after an inactivity period. This is because from a UE power consumption point of view it is not feasible to stay active continuously after a certain level of inactivity. However, interactive sessions generally last longer but are characterized by sporadic transmissions followed by long inactivity periods.

Hence, without active mode DRX, the UE is forced to loose connection and go into idle mode. This means that even if a higher layer level session is not completed, the UE has to undergo a complete access procedure to re-access the resources for transmissions after each inactivity period. In general, this increases the delay and also increases the risk of failure. In ad hoc networks, the connection re-establishment may take even longer than in usual classical networks. Certain interactive services such as gaming require relatively faster reaction time. Thus, without active mode DRX, it is challenging to support a wide range of services in ad hoc networks, unless the UE battery power consumption is compromised.

SUMMARY

Although the idea of DRX/DTX is appealing in adhoc networks, the fundamental problem is to configure and agree on DRX/DTX parameters by multiple ad-hoc nodes when a central infrastructure entity is missing and when the mobile terminals in ad-hoc mode are operating independently. This basic problem is even more challenging for mobile ad-hoc nodes whose physical distance as well as their mutual radio channel conditions change in time and space.

Thus the objective is to provide a solution for enabling DRX in wireless adhoc networks.

This is achieved by finding a node which can provide a reference signal pattern which can be used by a UE entering DRX mode for maintaining synchronization during the DRX operation.

According to a first aspect of the present invention a method in a UE connectable to an ad-hoc network and configured to enter DRX mode when connected to the ad-hoc network is provided. In the method, a node that is able to provide a reference signal comprising a pattern which can be used for synchronization purposes when in DRX mode in the ad-hoc network is determined and the reference signal from the determined node is received. Further, the UE enters the DRX mode and the received reference signal is used for maintaining synchronization during the DRX mode. When the DRX session is completed the UE leaves the DRX mode.

According to a second aspect of the present invention, a method in a node connectable to an ad-hoc network for supporting synchronization for a UE in DRX mode in the ad-hoc network is provided. In the method, a request is received to provide a reference signal comprising a pattern which can be used for synchronization for a UE entering DRX mode in the ad-hoc network, and the UE is informed which node that is able to provide the reference signal.

According to a third aspect of the present invention, a UE connectable to an ad-hoc network and configured to enter DRX mode when connected to the ad-hoc network. The UE comprises a processor for determining a node that is able to provide a reference signal comprising a pattern which can be used for synchronization purposes when in DRX mode in the ad-hoc network, a receiver for receiving the reference signal from the determined node, a DRX manager for entering and leaving DRX mode, and a synchronization unit for using the received reference signal during the DRX mode to maintain synchronization.

According to a fourth aspect of the present invention a node connectable to an ad-hoc network for supporting synchronization for a UE in DRX mode in the ad-hoc network is provided. The node comprises a receiver for receiving a request to provide a reference signal comprising a pattern which can be used for synchronization for a UE entering DRX mode in the ad-hoc network, and a transmitter for informing the UE which node that is able to provide the reference signal.

According to a fifth aspect of the present invention a method in a UE connectable to an ad-hoc network and configured to enter DRX mode when connected to the ad-hoc network is provided. In the method, information relating to the DRX operation of the UE is broadcasted, and a global reference timing which can be used for synchronization purposes when in DRX mode in the ad-hoc network is identified. The UE then enters the DRX mode, uses the global reference timing to maintain synchronization, and leaves the DRX mode.

According to a sixth aspect of the present invention a UE connectable to an ad-hoc network and configured to enter DRX mode when connected to the ad-hoc network is provided. The UE comprises a transmitter for broadcasting information relating to the DRX operation of the UE, a synchronization unit for identifying and using a global reference timing for maintaining synchronization when in DRX mode in the ad-hoc network, and a DRX manager for entering and leaving DRX mode.

An advantage with embodiments of the present invention is that they enable UEs in ad hoc network to operate in DRX operation which enables the UEs to save their power in the wireless ad hoc network. This implies that an ad hoc device can stay on line, in active mode, for a longer time even if it is not receiving data while still saving battery power.

The embodiments of the present invention also enables the UEs to operate in DRX in idle mode. Therefore another advantage is that DRX operation enables the UEs to save power also in idle mode.

A further advantage is that the DRX operation in active mode enables faster access, which is particularly useful for services requiring shorter reaction time.

DETAILED DESCRIPTION

Figure 1:
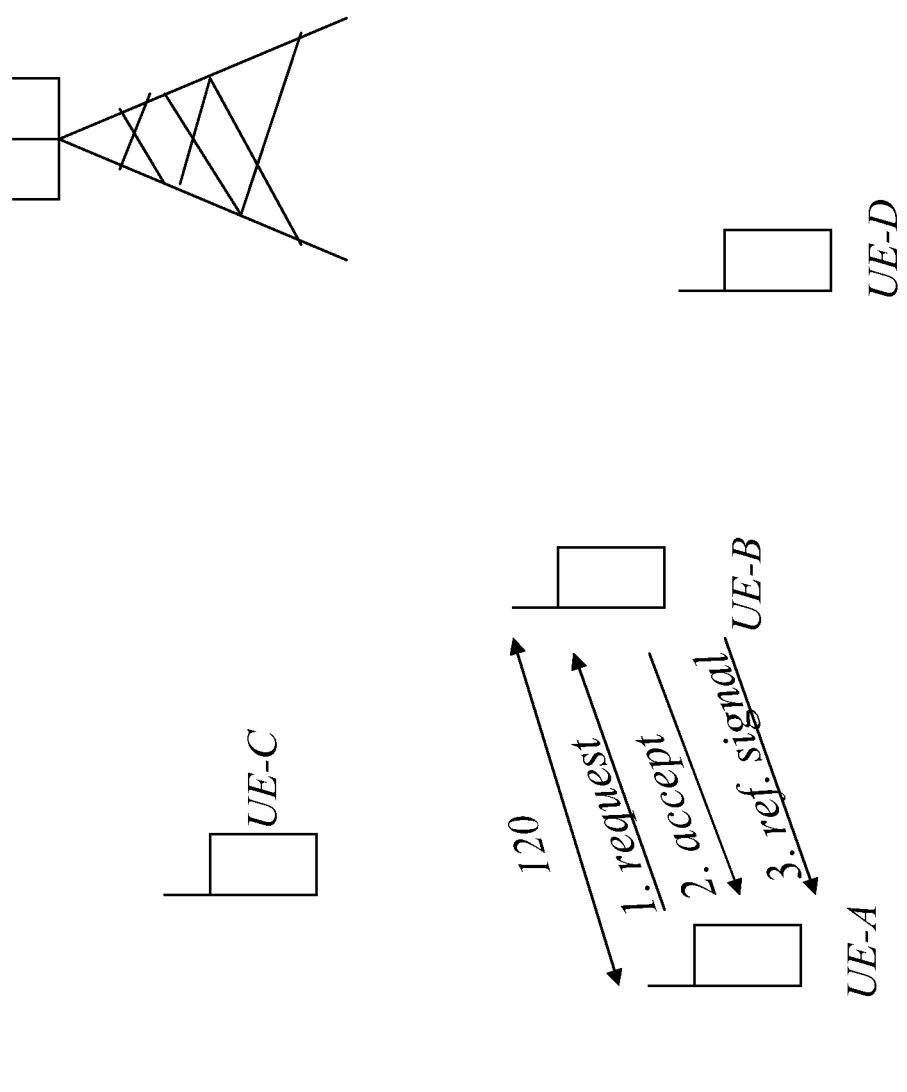
FIG. 1 illustrates a scenario according to a first embodiment of the present invention.

The present invention will be described more fully hereinafter with reference to the accompanying drawings, in which preferred embodiments of the invention are shown. The invention may, however, be embodied in many different forms and should not be construed as limited to the embodiments set forth herein; rather, these embodiments are provided so that this disclosure will be thorough and complete, and will fully convey the scope of the invention to those skilled in the art. In the drawings, like reference signs refer to like elements.

Moreover, those skilled in the art will appreciate that the means and functions explained herein below may be implemented using software functioning in conjunction with a programmed microprocessor or general purpose computer, and/or using an application specific integrated circuit (ASIC). It will also be appreciated that while the present invention is primarily described in the form of methods and devices, the invention may also be embodied in a computer program product as well as a system comprising a computer processor and a memory coupled to the processor, wherein the memory is encoded with one or more programs that may perform the functions disclosed herein.

The embodiments of the present invention relates to DRX operation, in either idle or active mode, in wireless ad-hoc networks. When the UE is in idle mode the serving node does not maintain full context, i.e. information, about the UE. Furthermore in idle mode the UE does not maintain any active connection with the serving node. This means that no resources are allocated to the UE in idle mode. The serving node sends paging message to the UE, which in turn attempts to establish a connection for receiving incoming calls/messages. In idle mode the UE autonomously change the serving node i.e. the UE performs node reselection which is analogous to cell reselection in cellular networks. In active mode, which is also referred to as connected mode, an active connection between the UE and the serving node is maintained. This requires that the serving node maintains full UE context, i.e. has full information about the UE, in the active mode. Examples of application of the embodiments of the present invention are Voice over IP, gaming, and best effort applications. DRX operation implies that a UE is allowed to turn off its receiver to save its battery power during time periods according to a DRX cycle.

When introducing DRX for wireless ad-hoc networks, it is required to establish and maintain synchronization around which the mutual DRX cycles can be defined and that such a synchronization mechanism needs to account for changes in the propagation characteristics due to mobility and other reasons such as propagation delay. If an ad-hoc node receives a signal with respect to which it can define its DRX cycle pattern, and this signal as well as the DRX cycle pattern are known to other ad-hoc nodes, then communication between ad-hoc nodes similarly to cellular UEs communicating with a base station while supporting DRX operation can take place. As stated above, the fundamental problem is to configure and agree on DRX/DTX parameters by multiple ad-hoc nodes when a central infrastructure entity is missing.

The basic concept of the embodiments of the present invention is to let a node initiate and maintain transmission of a specific reference signal pattern during the DRX operation of an adhoc device, referred to as a UE. The transmission of the reference signal pattern enables the UE to maintain synchronization, acquire channel state information by estimating the channel based on the reference signal pattern and compensate for any propagation delay variation due to the mobility during the DRX operation.

Figure 5:
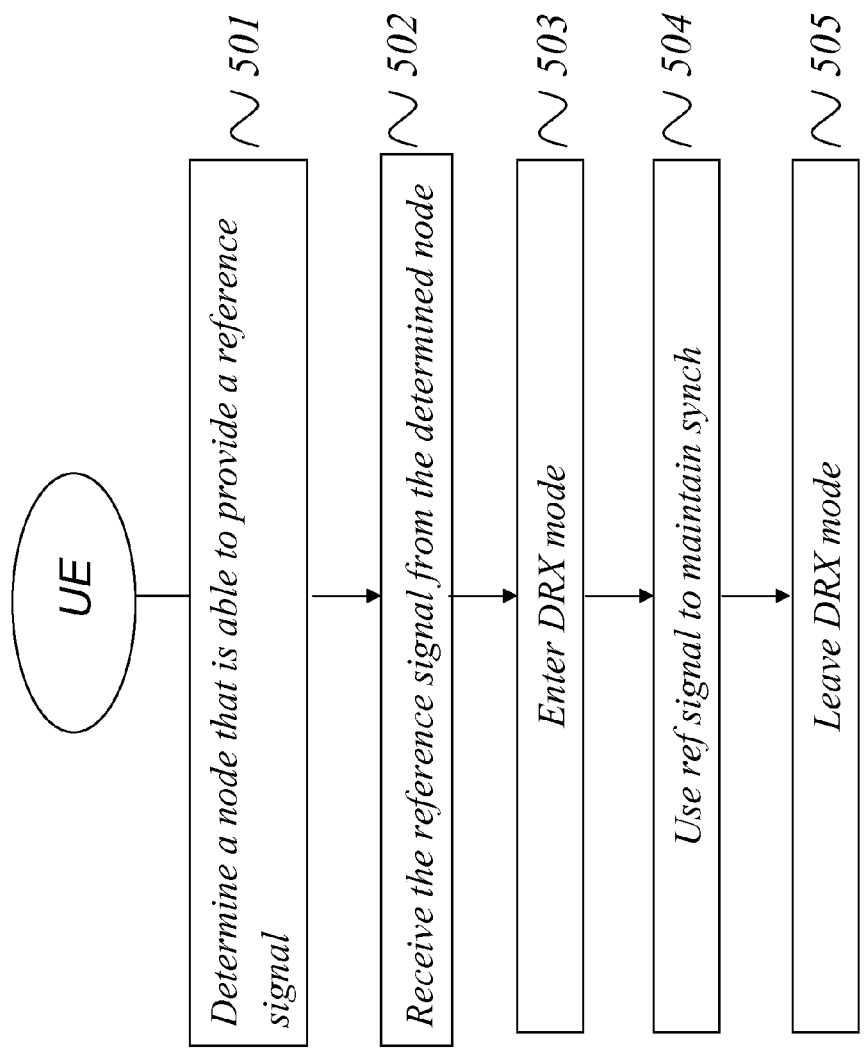
FIG. 5 is a flowchart of a method in a UE according to an embodiment of the present invention.

This is achieved by methods and arrangements in a wireless adhoc network where a UE is connectable to the wireless ad-hoc network according to the embodiments described below. The UE is configured to enter DRX mode in the ad-hoc network. As illustrated in a flowchart of FIG. 5, the UE determines 501 a node that is able to provide a reference signal comprising a pattern which can be used for synchronization purposes.

Furthermore, the UE then receives 502 the reference signal from the determined node. When the UE has received the reference signal, the UE enters 503 the DRX mode. The synchronization can now be maintained 504 thanks to the reference signals transmitted which are transmitted until the UE leaves 505 the DRX mode.

Figure 6:
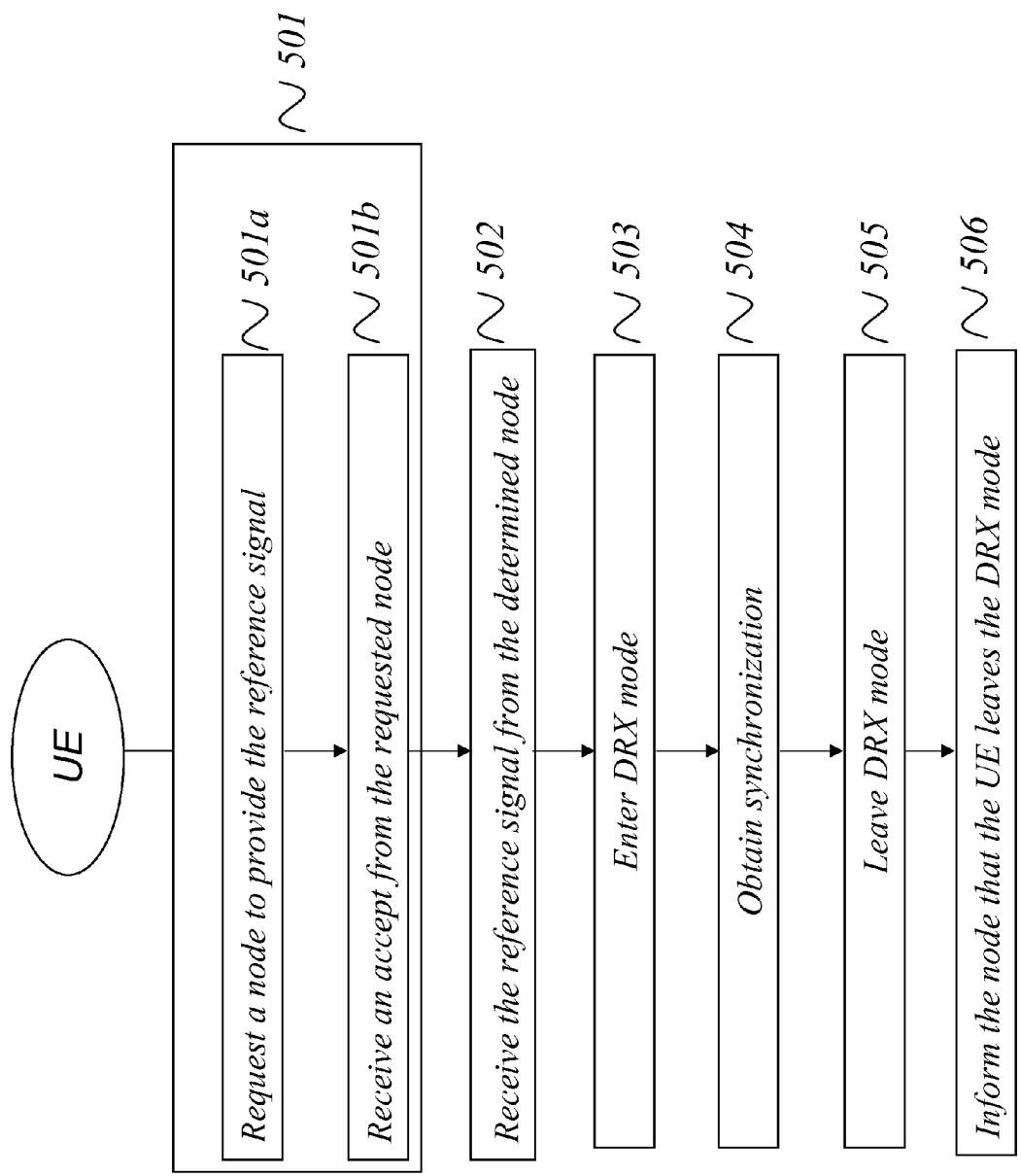
FIG. 6 is a flowchart of a method in a UE according to an embodiment of the present invention.

According to embodiments of the present invention as illustrated in FIG. 6, the UE determines 501 a node that is able to provide a reference signal comprising a pattern which can be used for synchronization purposes by requesting 501a a node to provide the reference signal and receiving 501b an accept signal or message from the requested node that is able to provide the reference signal. The node providing the reference signal is informed 506 when the UE leaves the DRX mode.

The request may comprise parameters associated with the DRX operation of the UE such as the DRX cycle length, starting time of the DRX mode, end time of the DRX mode, DRX on period, DRX off period etc. These parameters allow the node providing the reference signal to send a reference signal which is suitable to the DRX operation of the UE. For example if the DRX cycle is very long the node may transmit reference signal with long periodicity i.e. a sparse reference signal. For a shorter DRX cycle, the reference signal can be more dense.

The provided reference signal may typically comprise of a periodic pattern. However the pattern can also be quasi periodic in which periodic bursts of reference signals are transmitted. During a burst the reference signals may be aperiodic. The pattern may also be selected from a set of pre-defined patterns.

If the reference signal comprises a pattern of a set of pre-defined pattern, the requested node may signal parameters associated with the pattern of the reference signal to be provided. Examples of such parameters are an identifier of the pre-defined pattern of the reference signal, the periodicity of the occurrence reference signal, start time of the reference signal, end time of the reference signal etc.

According to a first embodiment, the node requested to provide the reference signal is another UE, which is illustrated in FIG. 1. The UE may determine said UE by sending the request to the last node with which the UE was communicating before the UE entered the DRX mode. The UE may also determine said node, i.e. UE, by maintaining a history of the last N nodes, with which the UE has established communication e.g. over the last time period T0. Hence if the last serving node cannot serve the UE DRX operation then the UE can try with another node in its list and so on. If no node is in the UE history list then the UE will send request to any set of available UE and could select a UE which has a best radio condition e.g. best SNR etc. Another scenario is when a UE is powered on and wants to stay in DRX. If the UE does not have a UE history list, the UE can send a request to any available UE as explained above. Another possibility is that the UE when powered on sends a request to another UE, i.e. node serving the DRX operation, which has indicated its desire to serve the DRX operation by providing the reference signal pattern. Such an indication could be sent by the UE, i.e. the node, directly via a broadcast message or via an intermediate node such as a cellular network node e.g. a base station. Yet another scenario is that the UE which intends to enter the DRX blindly detects if currently there are UEs, i.e. the nodes, serving the DRX operation for other UEs. The blind detection can be performed by correlating the known pre-defined patterns of the reference signal to the pattern transmitted by the said UEs, i.e. said nodes. The on going DRX operation is determined in case high correlation is observed by the UE. The identifier of the said UE (i.e. node) sending reference signal also maps to the pattern of the reference signal. Thus the correlation operation enables the UE to determine said UE currently available for the serving the DRX operation. Hence the UE can send the request to the said UE, whose DRX operation is blindly detected, when powered on or when it lacks the historical data or in any scenario. Yet another possibility is that several of the above scenarios can be combined to determine the most appropriate node, which can serve the DRX operation. For example the UE can sort the last N nodes with which the communication has been established, in terms of their signal qualities. The UE will then send request to the node, which has the strongest signal quality. In another example assume that the UE blindly detects M nodes currently serving the DRX operation. In this case the UE may send a request to a node, which has the strongest signal quality. Furthermore, the UE may also compare the nodes, which are blindly detected nodes and which have been used for the communication over the time period T0. The UE can send request to the node, which belong to both groups and also which has the best possible or acceptable level of received signal quality.

In the scenario of FIG. 1, the UE-A determines said UE by sending the request to the last node with which the UE was communicating before the UE entered the DRX mode as further explained below. Hence, the UE-A communicates with a UE-B for receiving and transmitting data via an adhoc connection 120. In the examples of the embodiments of the present invention, the UE-A is the receiving device and the UE-B is the transmitting device. Unlike the existing state of the art, the adhoc connection 120 between these UEs is retained even after the completion of the data transmission by allowing one or both of the UEs to enter DRX mode.

According to this embodiment, the UE-A initiates a procedure in order to enter DRX mode, which may be idle or connected. The UE-A may initiate this procedure at anytime and in particular after a certain transmission inactivity period. The procedure is described hereinafter.

The UE-A, prior to going into DRX, requests 1 the transmitting UE-B to support the DRX operation. In this case the UE-A sends a dedicated message directly to UE-B. In response, the UE-B accepts 2 the request and initiates the transmission of a reference signal pattern, thereby assisting UE-A to operate in DRX and the UE-A starts the DRX operation.

According to another aspect of this embodiment, the UE-B initiates transmission of the reference signal provided it has received requests from at least N (N≥1) UEs including UE-A. According to yet another aspect of this embodiment the UE-A may also try to find any suitable transmitting UE to support its DRX operation by sending the request for reference signals via a broadcast message. In this case the UE-A sends a broadcast message, which is received by a plurality of UEs. The broadcast message contains a request for supporting the DRX operation. In response to the broadcast message, one or more UEs may accept the request. The UE-A selects one of the UEs to support DRX operation, in case it receives response from multiple UEs. For instance UE-A may select the node whose signal quality is strongest so that the receive reference signal is reliably received. Another criterion may be that each UE also indicates if they are already serving/sending reference signal for other UEs to support their DRX operation. In that case UE-A may select a UE which is supporting DRX operation for other UEs as this is more power efficient solution. Thus eventually one of the UEs, e.g. UE-C assists UE-A in supporting its DRX operation by transmitting a reference signal pattern. The DRX operation and the corresponding reference signal transmission ends after an initially agreed time period or by explicit indication/request by any of the UEs.

Both dedicated and broadcast messages contain all necessary information pertaining to the DRX operation. For instance it may contain the DRX length, time to start DRX cycle, duration over which DRX operation to be supported etc.

Figure 9:
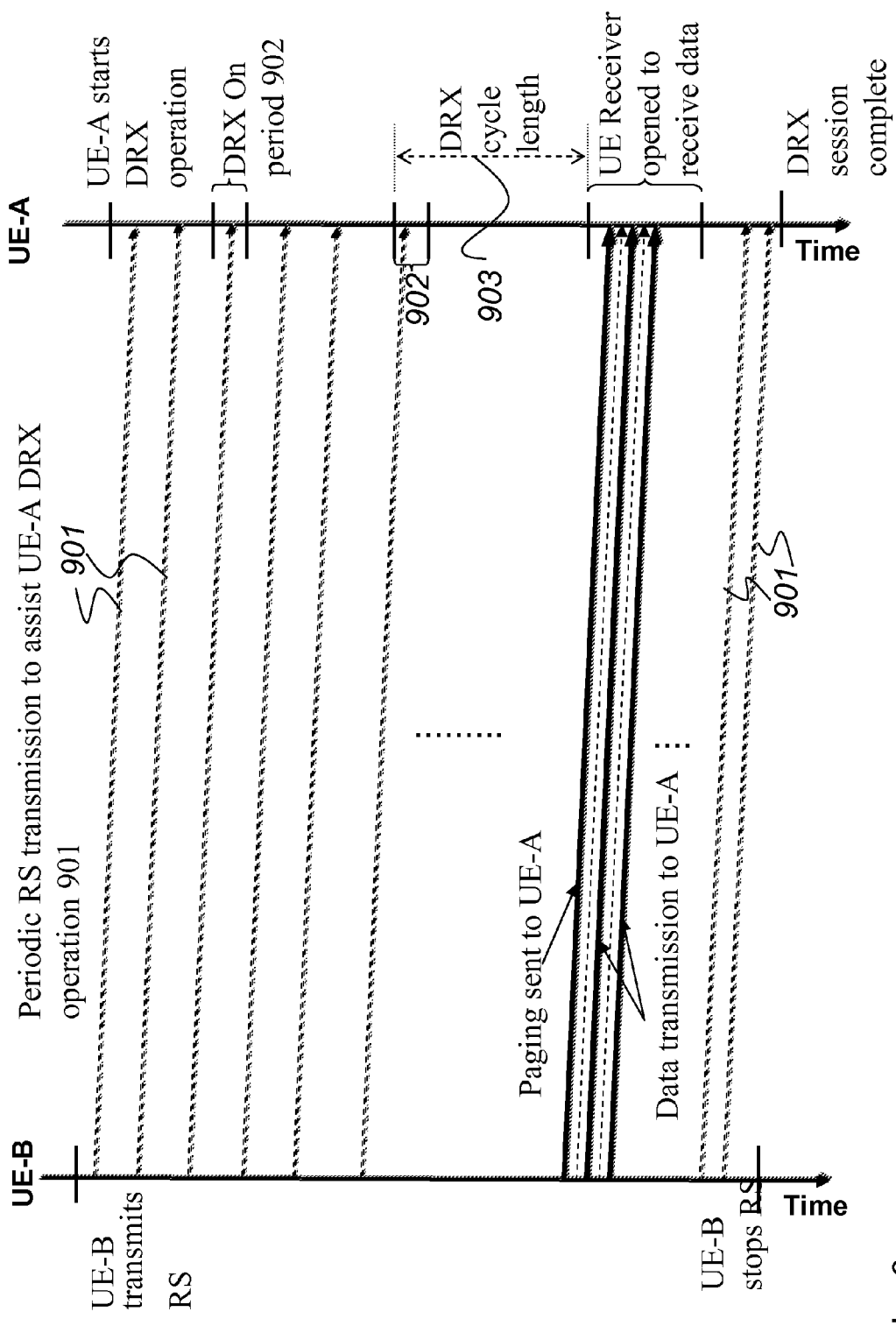
FIGS. 9 and 10 are sequence diagrams exemplifying different scenarios where embodiments of the present invention are used.

The reference signal is transmitted throughout the DRX operation as illustrated by FIG. 9. As an example, assume that the DRX cycle 903 is 640 ms. However the reference signal 901 is transmitted periodically every 20 ms. Another possibility is that a burst of periodic reference signal is transmitted every 80 ms. Each burst comprises of 5 ms. Hence in this example the reference signal transmission activity is much larger than the DRX cycle in use. When the DRX operation is over, the reference signal transmission is ceased. The pattern of the reference signal to support DRX operation can be one of the standardized or pre-defined patterns. The pattern can also be specific to devices. In order to be able to receive the reference signal during the DRX mode, the UE-A enters a DRX on period where the receiver is turned on during a short time period when the reference signal is transmitted from the UE-B. The DRX on period is equal to or larger than the duration of the channel, which carries the paging indicator or paging related information. Hence over the DRX on duration the UE should be able to receive the paging as well as the reference signal transmitted by the UE-B. The duration of the said channel and patterns of the reference signal are pre-defined. Hence the UE can determine the DRX on duration from the pre-defined duration of the said channel carrying the paging related information and the pattern of the reference signal. Alternatively the UE-B can also configure the UE-A with the DRX on duration to be used.

Figure 10:
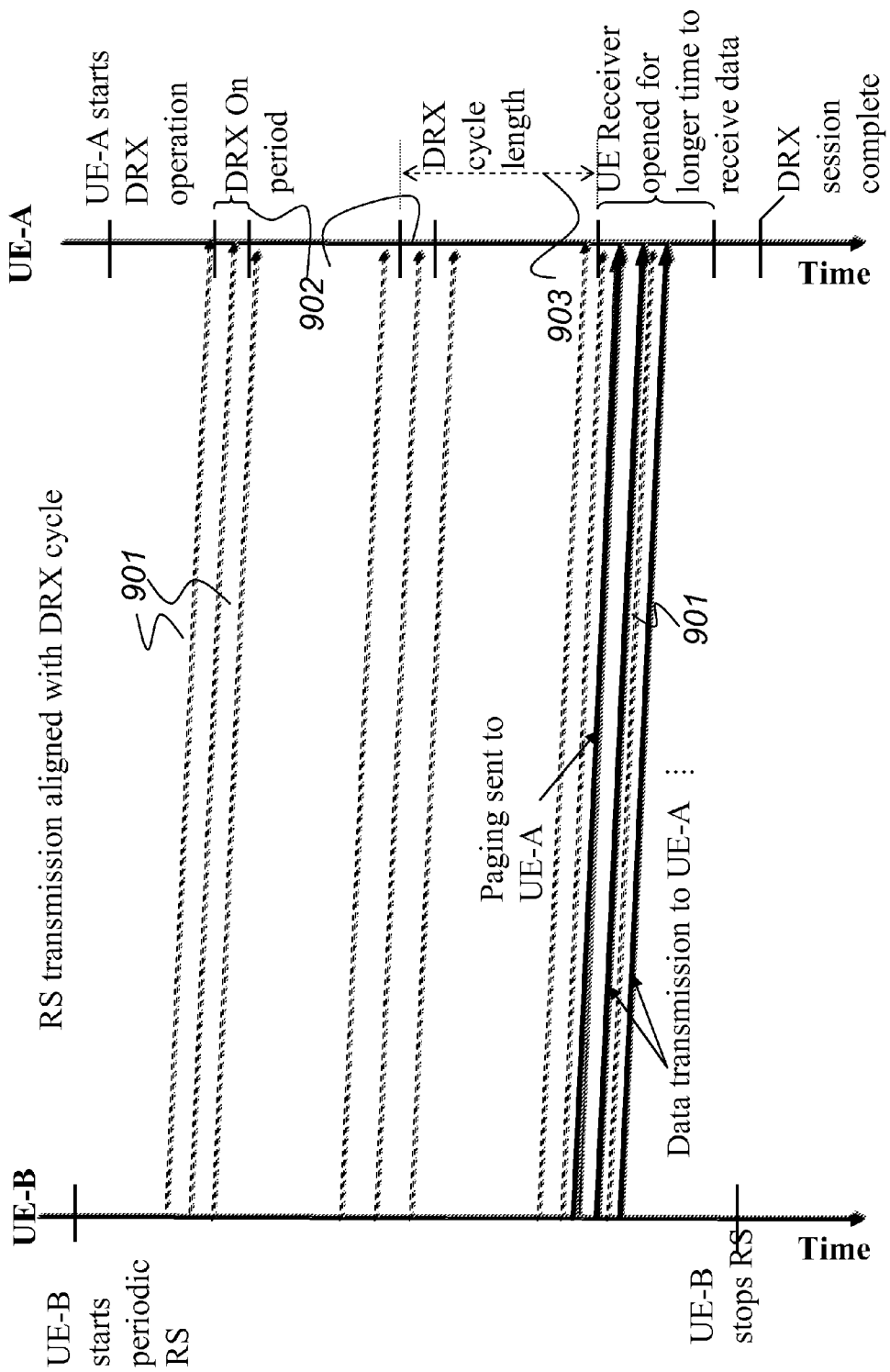

FIG. 10 illustrates a similar procedure as FIG. 9 except that the reference signal pattern is tied to the DRX cycles or they can be linked to a set of DRX cycles e.g. different patterns (pattern #1, #2 and #3 for small, medium and long DRX cycles respectively). For example assume the DRX cycle is 640 ms and the on duration is 1 ms i.e. UE activates its receiver once every 640 ms for 1 ms duration. The reference signal is also transmitted periodically once every 640 ms. Each periodic reference signal transmission may comprise of a burst of reference signal. Each burst may comprise of 5 ms, which is centered around the DRX on duration. Hence in this example the reference signal transmission activity is aligned with the DRX cycle in use.

Figure 2:
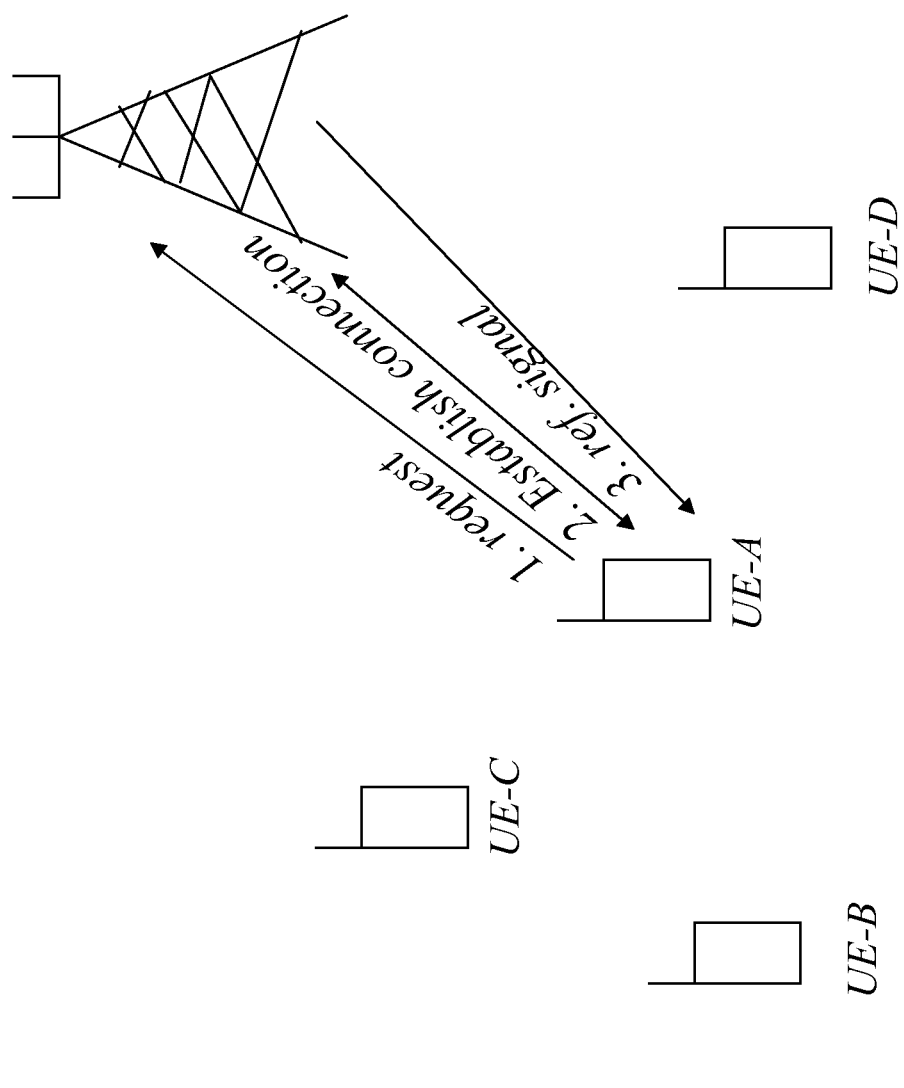
FIG. 2 illustrates a scenario according to a second embodiment of the present invention.

According to a second embodiment, the node requested to provide the reference signal is a network node as illustrated in FIG. 2.

The UE-A which is interested in entering into DRX state informs 1 the nearest network or infrastructure node e.g. base station its intention of going into DRX state by requesting the network node to provide a reference signal to support the DRX operation of the UE-A.

In response, the network node requests the UE-A to camp 2 on the network node temporarily or for a pre-determined time.

The DRX cycle to be used can be decided by the UE-A or by the network node or mutually by both. To assists the UE-A DRX operation, the network node regularly transmits the reference signal pattern. As a result, the UE-A goes into DRX state while maintaining synchronization with the said network node by listening to the reference signal. The reference signal shall be transmitted at least until the UE-A DRX operation assisted by the network node is terminated. The network node may therefore transmit the reference signal even if no UE is camping on it. However, the network node may also stop transmitting the reference signal after the termination of UE-A DRX operation, if no other UE is camping on the network node.

A UE may have multi-mode capability i.e. supporting ad hoc and cellular operation. It should be noted that this embodiment allows the ad hoc mode of the UE-A to camp on to the network node. The network node is therefore also capable of supporting ad hoc operation.

This embodiment is particularly beneficial in idle mode as it enables UE-A to receive page which may constitute critical information such as 'warning' or 'emergency calls'.

Figure 7:
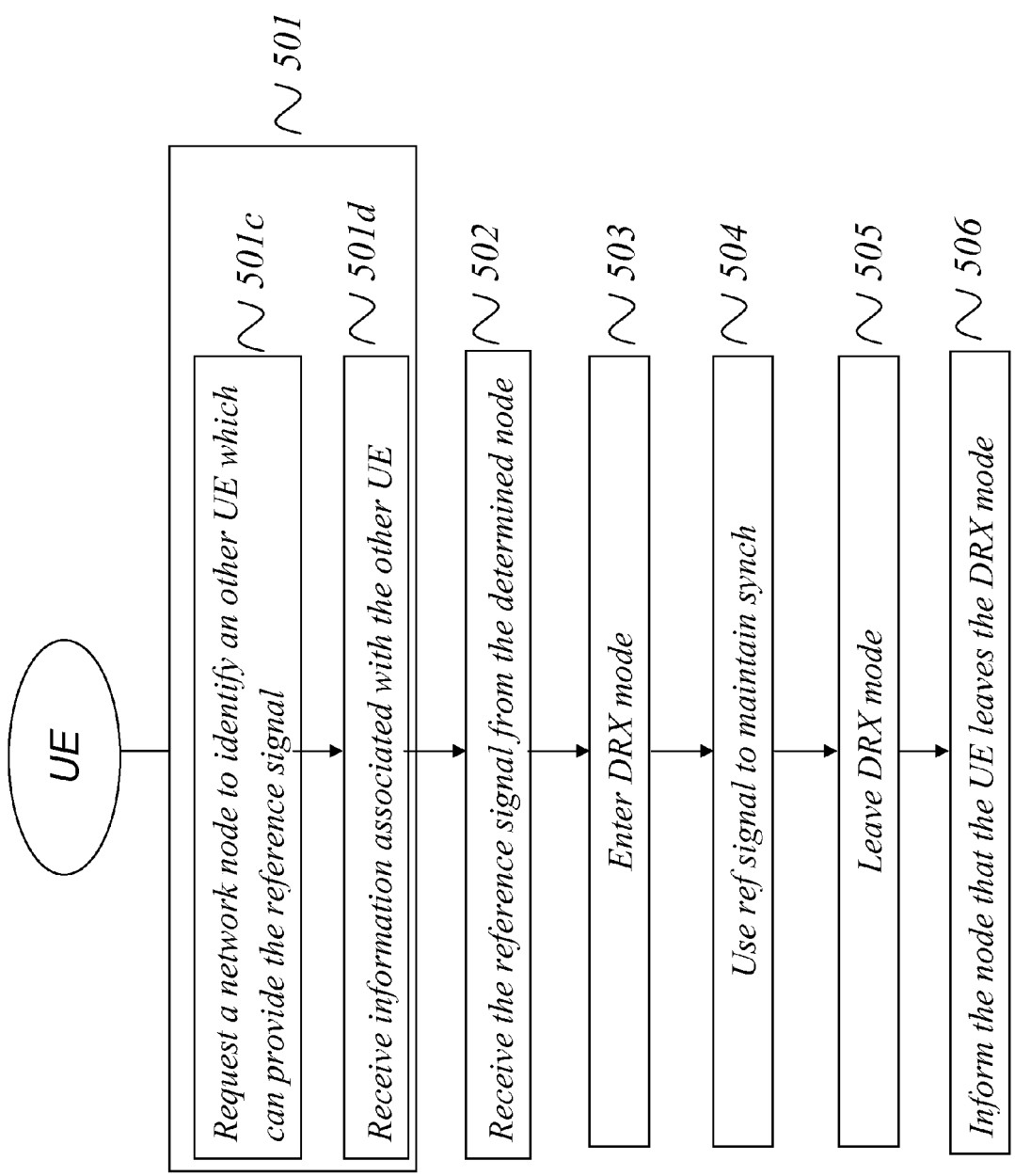
FIG. 7 is a flowchart of a method in a UE according to another embodiment of the present invention.

According to a third embodiment, a network node identifies a UE which can provide the reference signal to support the DRX operation i.e. as illustrated in the flowchart of FIG. 7, the UE which is about to enter DRX requests 501c a network node to identify another UE which can provide the reference signal, and then the UE receives 501d information associated with the other UE which can provide the reference signal. It should be noted that the UE must inform 506 the network node and/or the UE providing the reference signal when the UE using the reference signal for synchronization has left the DRX mode.

Also according to this third embodiment, the DRX operation of an adhoc UE-A is also assisted by the periodic transmission of a reference signal pattern by another adhoc UE. However, the difference compared to the first embodiment is that in this case the UE-A seeks assistance from an infrastructure node (e.g. a base station or any centralized node assisting adhoc operation etc) in finding a suitable UE, which can support its DRX operation by providing the reference signal pattern.

Figure 3:
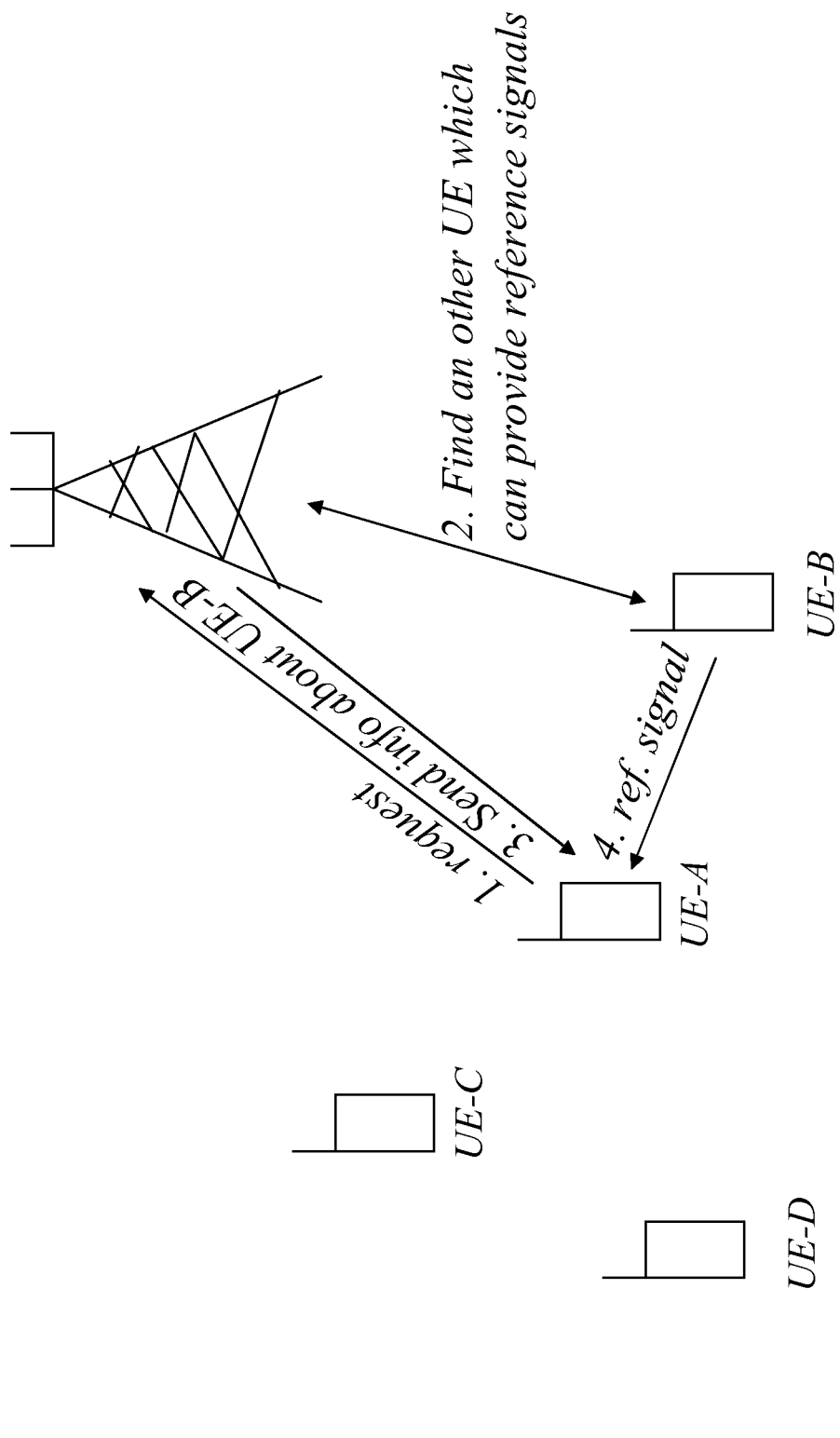
FIG. 3 illustrates a scenario according to a third embodiment of the present invention.

Hence, when UE-A wants to go into DRX mode, it sends 1 the request to the network node as illustrated in FIG. 3. The network node may maintain an updated list of UEs, which are willing to support DRX operation of other UEs. Alternatively, if there is no such list, or there is no UE in the list, the network node explicitly inquires 2 other UEs in the network if they are willing to support DRX operation.

If the network node finds e.g. a UE-B, which can support the DRX operation, then it indicates this to UE-A via a message 3. The information may contain details such as UE-B identities, physical layer parameters, time to start reference signal transmission, etc. The network node directs the UE-B to start transmitting 4 the pattern of the reference signal. Consequently, the UE-A starts its DRX operation. According to another aspect of this embodiment, the network node may find a suitable UE for transmitting a reference signal provided at least N (N≥1) UEs are interested in DRX operation.

The DRX operation stops and the corresponding reference signal transmission terminates after the initially agreed time period or by explicit indication/request sent to the network node by either UE-A or UE-B.

As in the first embodiment, the reference signal is transmitted throughout the DRX operation. Similarly, the pattern of the reference signal can be one of the standardized or pre-defined patterns or can be specific to devices. Alternatively, the patterns can be tied to the DRX cycles or they can be linked to set of DRX cycles e.g. different patterns (pattern #1, #2 and #3 for small, medium and long DRX cycles respectively).

Figure 8:
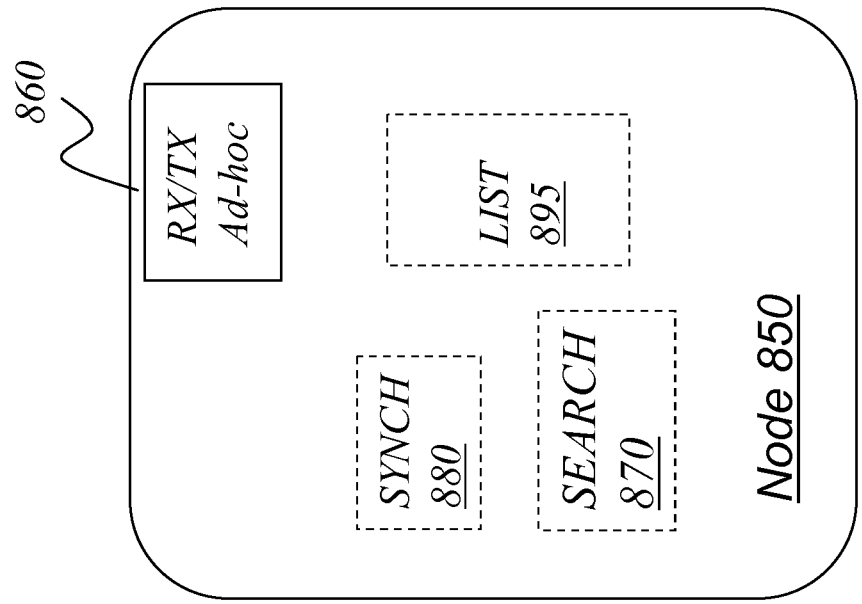
FIG. 8 illustrates a UE and a node according to embodiments of the present invention.
Figure 8:
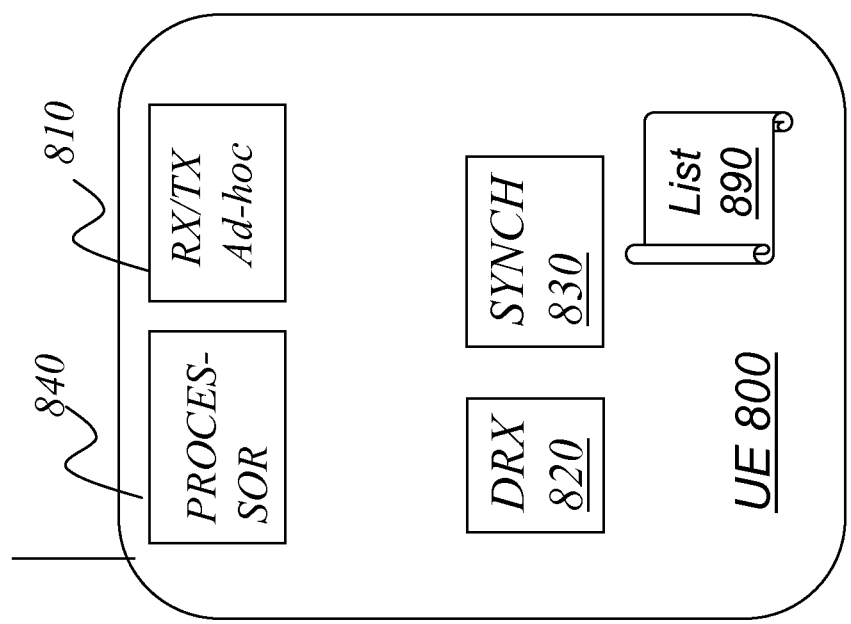

Turning now to FIG. 8 which illustrates a UE 800 configured to enter DRX mode when involved in an ad-hoc network and a node 850 which is able to provide the reference signal used to support the synchronization of the UE 800, either directly or indirectly according to embodiments of the present invention. The UE comprises a radio access interface 810 for ad-hoc communication. The radio access interface comprises circuitry and functions for transmission/reception according to the relevant radio access technology, e.g. Bluetooth.

The UE 800 is thus connectable to an ad-hoc network and configured to enter DRX mode when connected to the ad-hoc network. The UE comprises a processor 840 for determining a node that is able to provide a reference signal comprising a pattern which can be used for synchronization purposes when in DRX mode in the ad-hoc network, a receiver 810 for receiving the reference signal from the determined node, a DRX manager 820 for entering and leaving DRX mode, and a synchronization unit 830 for using the received reference signal during the DRX mode to maintain synchronization.

According to embodiments of the present invention, the processor 840 is further configured to request the node 850 to provide the reference signal, and to receive an accept signal or message from the requested node which is able to provide the reference signal. The node 850 may be a UE or a network node. If the node 850 is a UE, the processor 840 is configured to send the request dedicated to the other UE or by broadcast to a plurality of UEs. If the node is a network node, the UE is required to camp on the network node to receive the reference signal.

According to a further embodiment, the processor 840 of the UE 800 is also configured to request a network node to identify another UE which can provide the reference signal, and to receive information associated with the other UE which can provide the reference signal. In this embodiment, the UE 800 further comprises a transmitter 810 for informing the network node and/or the UE providing the reference signal when the UE using the reference signal for synchronization has left the DRX mode. The UE 800 may also comprise a history list 890 of the last N nodes, with which it has establish communication e.g. over the last time period T0. This list 890 may be used to select a node to which the request to provide the reference signal is sent.

Moreover, the node 850 is connectable to an ad-hoc network for supporting synchronization for a UE 800 in DRX mode in the ad-hoc network. The node 850 comprises a receiver 860 for receiving a request to provide a reference signal 880 comprising a pattern which can be used for synchronization for a UE entering DRX mode in the ad-hoc network, a transmitter 860 for informing the UE which node that is able to provide the reference signal 880. According to one embodiment, the node 850 is another UE and that the other UE 850 is configured to provide the reference signal 880 until it receives information from the UE 800 that it has left the DRX mode. In another embodiment, the node 850 is a network node and that the network node 850 is configured to allow the UE 800 to camp on the network node 850 to be able to receive the provided reference signal as long as the UE is in DRX mode. The node may also be a network node 850 comprising a searching unit 870 for determining an other UE which can provide the reference signal, and wherein the transmitter 860 is further configured to inform the UE of the determined other UE by sending parameters associated with the other UE. The searching unit 870 may use a list 895 for finding a UE that can provide the reference signal.

Figure 11:
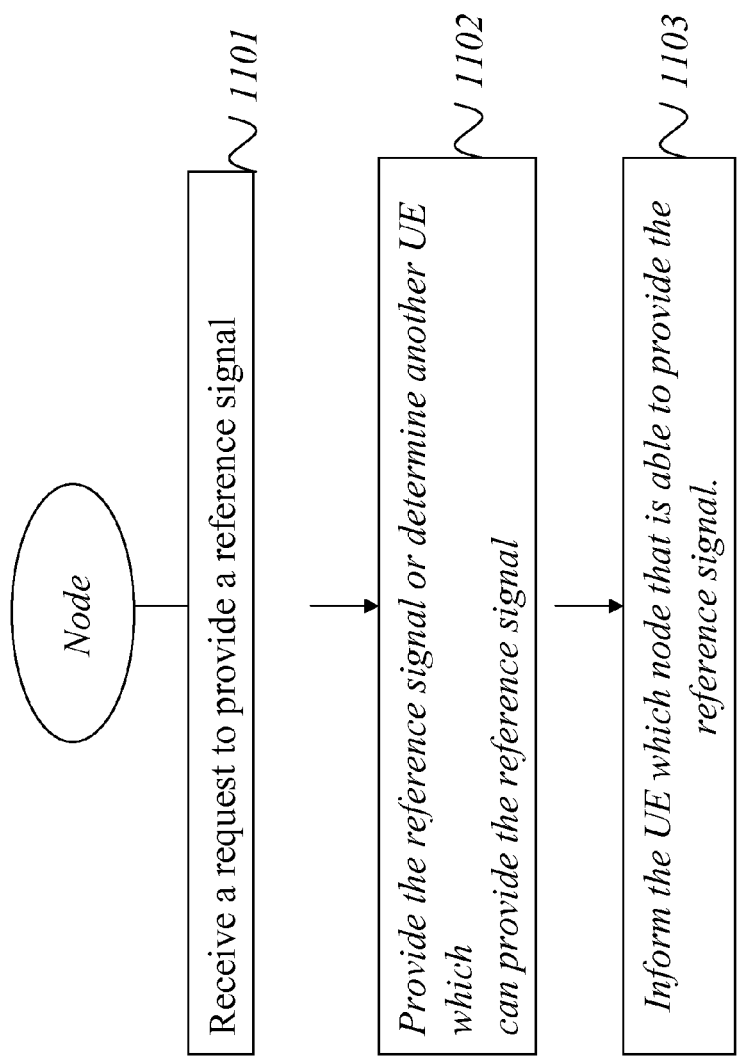
FIG. 11 is a flowchart of a method in a node according to an embodiment of the present invention.

As illustrated in the flowchart of FIG. 11, a method in a node connectable to an ad-hoc network for supporting synchronization for a UE in DRX mode in the ad-hoc network is provided. The node receives 1101 a request to provide a reference signal comprising a pattern which can be used for synchronization for a UE entering DRX mode in the ad-hoc network. Then the node either provides 1102 the reference signal itself or finds 1102 another UE which can provide the reference signal and informs 1103 the UE which node that is able to provide the reference signal.

Figure 4:
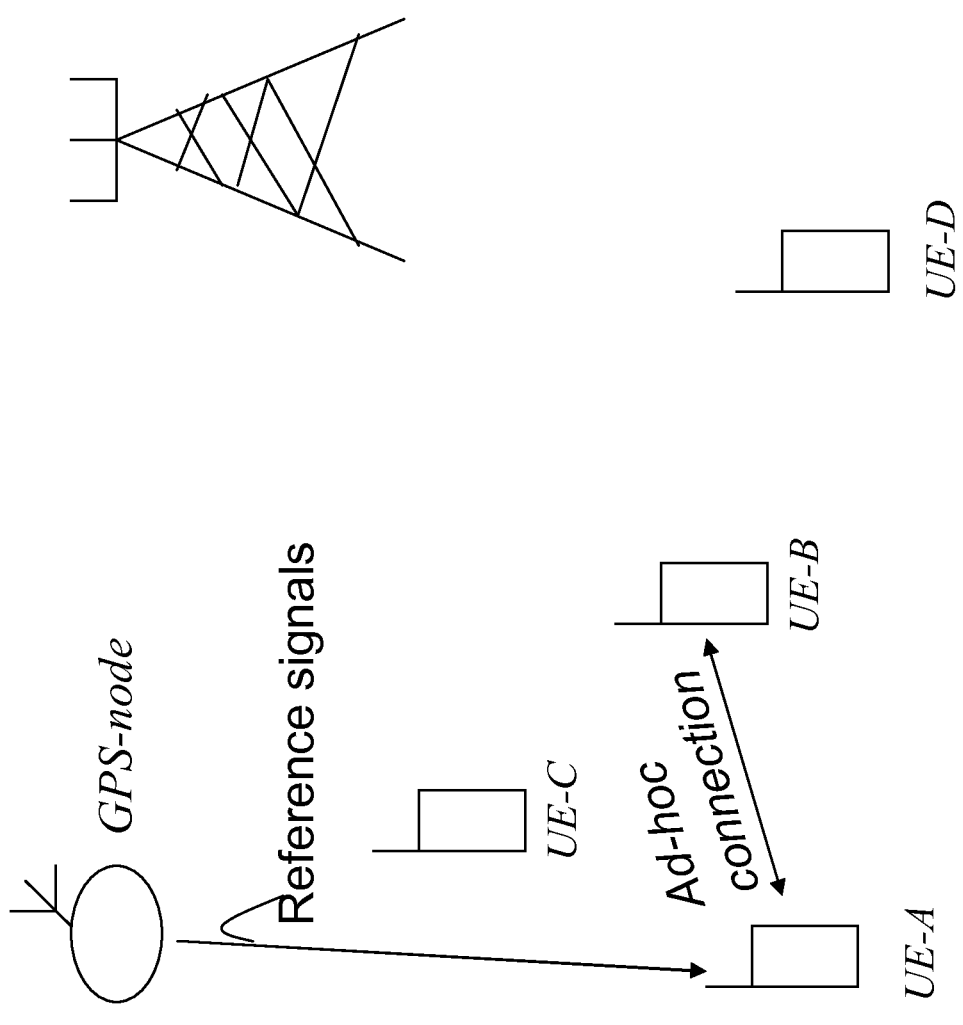
FIG. 4 illustrates a scenario according to a fourth embodiment of the present invention.

According to a fourth embodiment, the DRX operation is maintained with respect to a reference timing which is common to the communicating ad hoc devices including the UE which is about to enter DRX mode. This reference timing may be a global reference timing obtained via a signal from a global node such as a GPS node or any global navigational satellite system (GNSS) node as illustrated in FIG. 4 where the UE-A and the UE-B is in ad-hoc communication and the UE-A is the receiving device and the UE-B is the transmitting device. The reference timing may also be provided by the infrastructure node. Similarly, the reference timing can be used by any of the UEs involved in DRX operation i.e. either by the UE-A or by the UE-B in this example.

Figure 12:
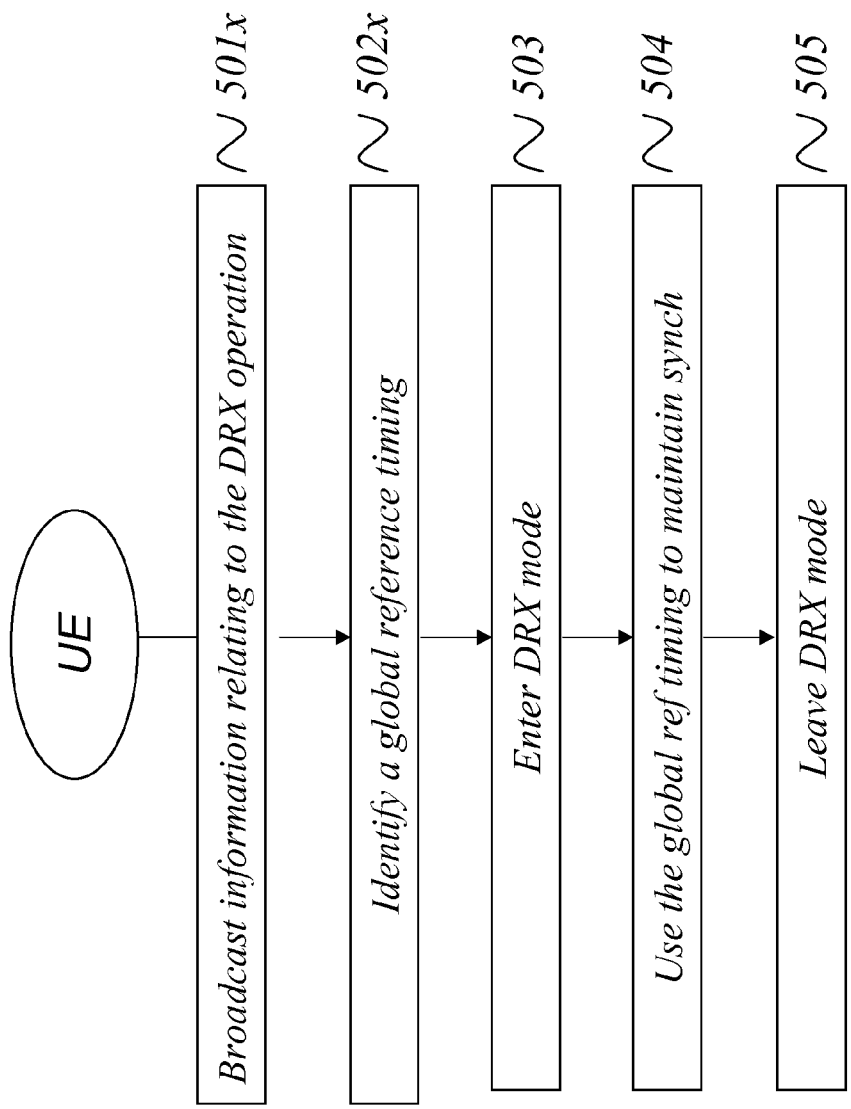
FIG. 12 is a flowchart of a method in a UE according to an embodiment of the present invention.

As illustrated in FIG. 12, the method according to the fourth embodiment comprises:

Broadcast Information relating to the DRX operation of the UE is broadcasted 501x and a global reference timing is identified 502x which can be used for synchronization purposes when in DRX mode in the ad-hoc network. Then the UE enters 503 the DRX mode and using 504 the global reference timing to maintain synchronization. When the DRX session is complete, the UE leaves 505 the DRX mode.

Accordingly, the UE 800 as shown in FIG. 8 comprises a transmitter 810 for broadcasting information relating to the DRX operation of the UE, a synchronization unit 830 for identifying and using a global reference timing for maintaining synchronization when in DRX mode in the ad-hoc network, and a DRX manager 820 for entering and leaving DRX mode.

In this embodiment, the UE does not require or make use of any reference signal from another UE or infrastructure node for supporting its DRX operation. This means that the ad hoc UE-A which intends to enter DRX mode does not require assistance of any other UE in terms of reference signal transmission. Rather, as explained above the UE-A makes use of some reference time or any clock common to the UE-A and the UE-B, i.e. the device in ad-hoc communication with UE-A, to run its DRX operation such as a Global Positioning System (GPS) signal from a GPS node or a signal from a Global Navigation Satellite System (GNSS). I.e., this reference should be some sort of universal or global reference time to prevent ambiguity. Also the UE-B uses this global reference timing when it decides when to initiate a new transmission. In this way, the UE-B can avoid sending data to UE-A when UE-A is unavailable due to the DRX operation.

Assume that UE-A wants to enter DRX mode. Prior to entering DRX, the UE-A broadcasts or announces certain details of its DRX operation in relation to a global reference time e.g. identity of the reference clock or time, DRX cycle, start of DRX operation with respect to the reference clock or time, end of DRX operation or duration of DRX operation, etc. In addition, the UE-A may also broadcast its geographical location e.g. Global Positioning System (GPS) or Global Navigation Satellite System (GNSS) coordinates or any rough position. Certain parameters such as reference clock to be used for autonomous DRX operation can also be a pre-defined universal clock. Alternatively, a default universal clock can be used unless the reference time is not explicitly included in the broadcast message. Thus the use of a reference clock to run the DRX operation ensures that other nodes know when the UE-A is reachable, i.e. not in DRX mode. Most likely the broadcast message sent by the UE-A is received by the last M served/transmitting nodes. The message may also be received by any other device in the ad hoc network. Nonetheless, any device which listens to the broadcast message is able to serve the UE-A, i.e. can initiate data transmission towards UE-A operating in DRX. The additional location broadcasted information may allow nearby UEs, which are aware of their location, to serve the UE-A.

In certain scenarios, the use of a global reference clock for DRX operation might be problematic for the initial data reception. However, the DRX operation with respect to the global reference clock may still be realizable without any significant degradation provided the radio propagation channel or conditions change very slowly; and that no significant change in propagation delay exists.

However a slightly modified scheme allows even this method of operating DRX with respect to the global reference clock under varying propagation conditions. The modified scheme requires that preferably both or at least one of the following are employed:

The transmitter i.e. the transmitting UE-B repeats the initial transmission L times.

A parameter L which is the number of repeated initial transmissions can be pre-defined or configurable or even UE implementation specific. This enables the receiving UE-A to obtain synchronization at the start of data reception since the receiver also sends pilots for demodulation.

The DRX ON duration ($T_D$) of the receiving UE-A is extended, i.e. kept longer.

The ON duration ($T_D$) can be set according to the largest possible propagation delay in a particular or typical ad hoc network scenario. This parameter can be pre-defined or configurable. An extended ON duration will allow the UE-A to listen to the possible data reception over a longer duration thus circumventing the propagation delay problem.

According to a fifth embodiment, the DRX operation is maintained with respect to a reference timing which is common to the communicating ad hoc devices including the UE which is about to enter DRX mode as described in the fourth embodiment and by using the reference signal comprising a pattern which can be used for synchronization purposes as described in preceding first to third embodiments. The combined use of the common reference timing and the reference signal enables the transmitting UE-B supporting DRX operation to significantly reduce the transmission of the reference signals. This means UE-B can save its transmission power by periodically but sparsely transmitting the reference signal. Hence the receiving UE-A operating in DRX can occasionally demodulate the reference signal to achieve synchronization. This method is useful when radio conditions vary slowly and the propagation delay between the transmitting and the receiving devices is small. This embodiment combines methods described in the fourth embodiment with any of the methods described in first to third embodiments.

The invention claimed is:

1. A method in a first User Equipment (UE) connectable to an ad-hoc network and configured to enter Discontinuous Reception (DRX) mode when connected to the ad-hoc network, the method comprising the steps of:
   determining a node in the ad-hoc network that is able to provide a reference signal comprising a pattern that can be used for synchronization purposes when in DRX mode in the ad-hoc network, wherein the determining step includes:
      requesting the node to indicate whether the node is able to provide the reference signal; and
      receiving an accept signal or message from the node indicating that the node is able to provide the reference signal;
   receiving the reference signal from the determined node;
   entering DRX mode;
   using the received reference signal for maintaining synchronization while the UE is in the DRX mode; and
   leaving the DRX mode;
   wherein the node is a different, second UE in the ad-hoc network.

2. The method according to claim 1, wherein the request is sent dedicated to the second UE.

3. The method according to claim 2, wherein the second UE is the last UE with which the first UE was communicating before the first UE entered the DRX mode.

4. The method according to claim 2, wherein the first UE includes a history list comprising other UEs and the second UE is selected from the history list.

5. The method according to claim 1, wherein the request is broadcasted to a plurality of UEs in the ad-hoc network.

6. The method according to claim 1, wherein the request for the reference signal comprises parameters associated with the DRX operation of the first UE.

7. A method in a first User Equipment (UE) connectable to an ad-hoc network and configured to enter Discontinuous Reception (DRX) mode when connected to the ad-hoc network, the method comprising the steps of:
  determining a node in the ad-hoc network that is able to provide a reference signal comprising a pattern that can be used for synchronization purposes when in DRX mode in the ad-hoc network, wherein the determining step includes:
    requesting the node to indicate whether the node is able to provide the reference signal; and
    receiving an accept signal or message from the node indicating that the node is able to provide the reference signal;
  receiving the reference signal from the determined node;
  entering DRX mode;
  using the received reference signal for maintaining synchronization while the UE is in the DRX mode; and
  leaving the DRX mode;
  wherein the determining step further comprises:
  requesting the node to identify a different, second UE in the ad-hoc network that can provide the reference signal; and
  receiving from the node, information associated with the second UE that can provide the reference signal; and
  the method comprises the further step of:
    informing the node and/or the second UE providing the reference signal when the first UE using the reference signal for synchronization has left the DRX mode.

8. A method in a node connectable to an ad-hoc network for supporting synchronization for a first User Equipment (UE) in Discontinuous Reception (DRX) mode in the ad-hoc network, the method comprising the steps of:
  receiving a request from the first UE to indicate whether the node is able to provide a reference signal comprising a pattern which can be used for synchronization for the first UE entering DRX mode in the ad-hoc network;
  informing the first UE that the node is able to provide the reference signal; and
  providing the reference signal to the first UE in the ad-hoc network;
  wherein the node is a different, second UE in the ad-hoc network.

9. The method according to claim 8, wherein the second UE provides the reference signal until it receives information from the first UE that the first UE has left the DRX mode.

10. A method in a node connectable to an ad-hoc network for supporting synchronization for a first User Equipment (UE) in Discontinuous Reception (DRX) mode in the ad-hoc network, the method comprising the steps of:
  receiving a request from the first UE to indicate whether the node is able to provide a reference signal comprising a pattern which can be used for synchronization for the first UE entering DRX mode in the ad-hoc network;
  informing the first UE that the node is able to provide the reference signal; and providing the reference signal to the first UE in the ad-hoc network;
  wherein the node is a network node and the network node requires the first UE to camp on the network node to be able to receive the provided reference signal as long as the first UE is in DRX mode.

11. A first User Equipment (UE) connectable to an ad-hoc network and configured to enter Discontinuous Reception (DRX) mode when connected to the ad-hoc network, the first UE comprising:
  a processor for determining a node in the ad-hoc network that is able to provide a reference signal comprising a pattern which can be used for synchronization purposes when in DRX mode in the ad-hoc network, wherein the processor is configured to request the node to indicate whether the node is able to provide the reference signal, and to receive an accept signal or message from the requested node indicating that the requested node is able to provide the reference signal;
  a receiver for receiving the reference signal from the determined node;
  a DRX manager for entering and leaving DRX mode; and
  a synchronization unit for using the received reference signal during the DRX mode to maintain synchronization;
  wherein the requested node is a different, second UE in the ad-hoc network.

12. The first UE according to claim 11, wherein the processor is configured to send the request dedicated to the second UE.

13. The first UE according to claim 12, wherein the second UE is the last UE with which the first UE was communicating before the first UE entered the DRX mode.

14. The first UE according to claim 12, wherein the first UE includes a history list comprising other UEs and the first UE is configured to select the second UE from the history list.

15. The first UE according to claim 11, wherein the processor is configured to broadcast the request to a plurality of nodes in the ad-hoc network.

16. The first UE according to claim 11, wherein the request for the reference signal comprises parameters associated with the DRX operation of the first UE.

17. A node connectable to an ad-hoc network for supporting synchronization for a first User Equipment (UE) in Discontinuous Reception (DRX) mode in the ad-hoc network, the node comprising:
  a receiver for receiving a request from the first UE to indicate whether the node is able to provide a reference signal comprising a pattern which can be used for synchronization for the first UE entering DRX mode in the ad-hoc network;
  a processor for determining that the node is able to provide the reference signal; and
  a transmitter for informing the first UE that the node is able to provide the reference signal and for providing the reference signal to the first UE in the ad-hoc network;
  wherein the node is a different, second UE in the ad-hoc network.

18. The node according to claim 17, wherein the second UE is configured to provide the reference signal until it receives information from the first UE that the first UE has left the DRX mode.

19. A node connectable to an ad-hoc network for supporting synchronization for a first User Equipment (UE) in Discontinuous Reception (DRX) mode in the ad-hoc network, the node comprising:
  a receiver for receiving a request from the first UE to indicate whether the node is able to provide a reference signal comprising a pattern which can be used for synchronization for the first UE entering DRX mode in the ad-hoc network;
  a processor for determining that the node is able to provide the reference signal; and
  a transmitter for informing the first UE that the node is able to provide the reference signal and for providing the reference signal to the first UE in the ad-hoc network;
  wherein the node is a network node and the network node is configured to require the first UE to camp on the network node to be able to receive the provided reference signal as long as the first UE is in DRX mode.

20. The node according to claim 19, wherein the node is a network node and the network node comprises a searching unit for determining whether a different, second UE in the ad-hoc network can provide the reference signal, and wherein the transmitter is further configured to inform the first UE of the determined second UE by sending parameters and identification details associated with the second UE to the first UE.

21. A User Equipment (UE) connectable to an ad-hoc network and configured to enter Discontinuous Reception (DRX) mode when connected to the ad-hoc network, the UE comprising:
- a transmitter for broadcasting information specifying parameters to be used by the UE during the DRX operation of the UE;
- a processor for determining a node in the ad-hoc network that is able to provide a global timing reference, wherein the node is a different, second UE in the ad-hoc network;
- a synchronization unit for identifying and using the global timing reference from the second UE to maintain synchronization when in DRX mode in the ad-hoc network; and
- a DRX manager for entering and leaving the DRX mode.

* * * * *